Feb. 3, 1948. R. A. CLAY 2,435,200
SHOCK ABSORBER
Filed Aug. 9, 1946 2 Sheets-Sheet 1

Robert A. Clay, INVENTOR

BY Stone, Boyden & Mack,
ATTORNEYS

Feb. 3, 1948.                    R. A. CLAY                    2,435,200
                              SHOCK ABSORBER
                          Filed Aug. 9, 1946                2 Sheets-Sheet 2
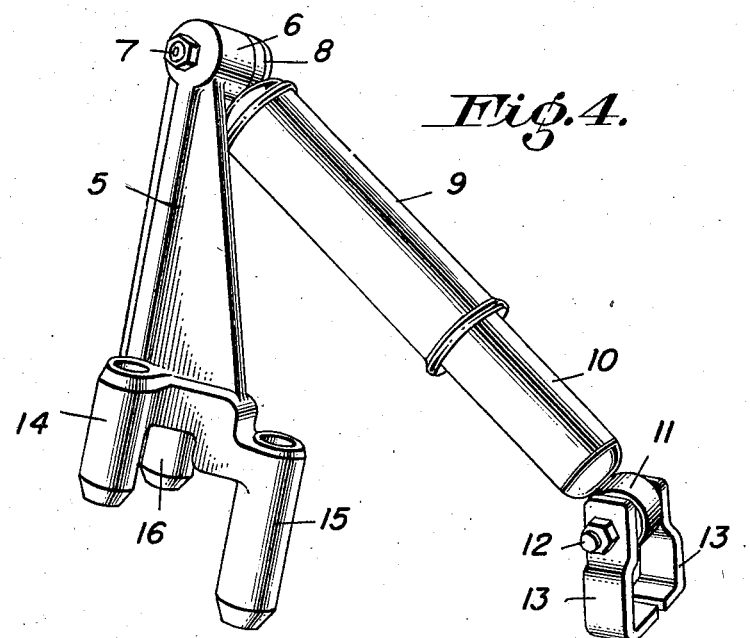
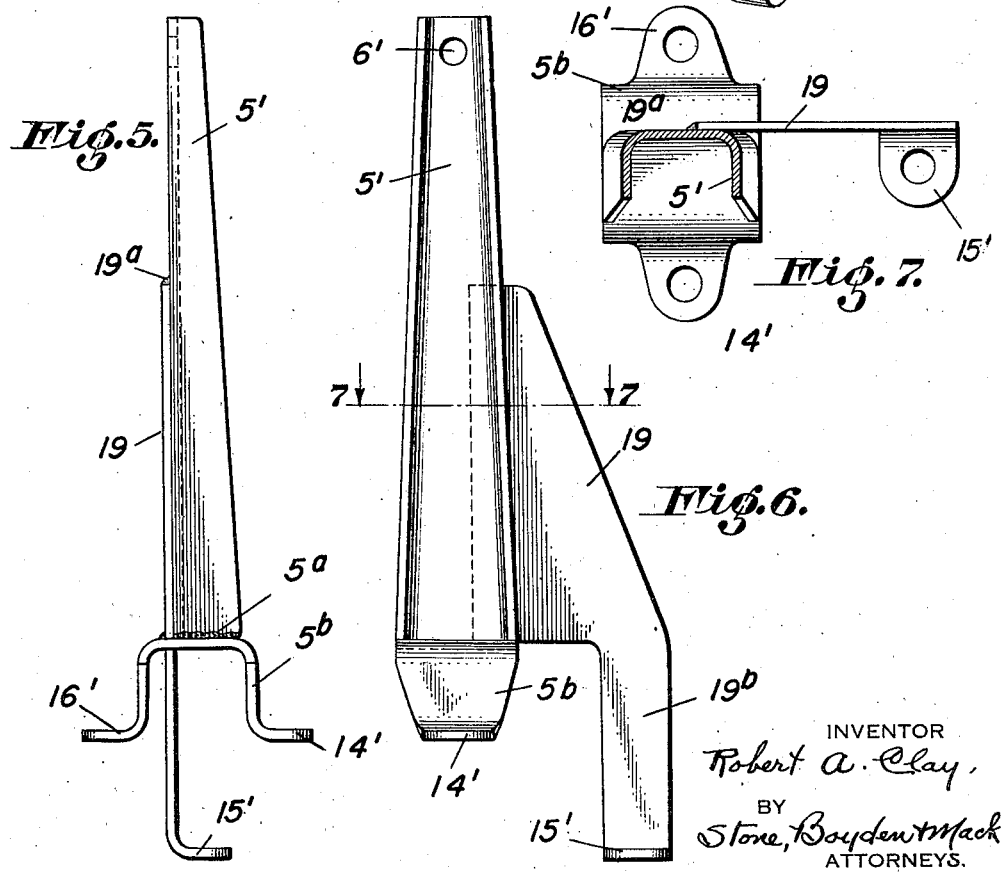
INVENTOR
Robert A. Clay,
BY
Stone, Boyden & Mack,
ATTORNEYS.

Patented Feb. 3, 1948

2,435,200

UNITED STATES PATENT OFFICE 2,435,200

SHOCK ABSORBER

Robert A. Clay, San Antonio, Tex.

Application August 9, 1946, Serial No. 689,578

6 Claims. (Cl. 188—88)

This invention relates to shock absorbers for automobiles, and more particularly to shock absorbers of the type commonly employed in connection with independently sprung so-called "knee action" front wheels.

A type of shock absorber which has been used for a number of years as standard equipment on certain well known makes of automobiles comprises a hydraulic cylinder containing a piston operated by a pivoted arm, which arm is connected with the spindle support of the front wheel. It has been found in practice that this equipment does not afford quite as much stabilizing action as is desirable for maximum efficiency and driving comfort, and the general object of the present invention is to provide a shock absorber structure of this character having greater stabilizing ability.

A more specific object of the invention is to provide an attachment for the standard hydraulic shock absorber of the above described type, such attachment comprising an auxiliary shock absorber, so that, when applied, a dual shock absorber structure is produced which affords the desired stability.

A still further specific object of the invention is to provide an attachment of this character which may be readily applied to the standard equipment now in use, and mounted thereon by means of the same bolts or studs used to secure the standard equipment in position.

In order that the invention may be readily understood, reference is had to the accompanying drawing, forming part of this specification, and in which—

Fig. 4 is a perspective view of the attachment itself as it appears before being mounted in place;

Fig. 5 is a side elevation showing a modified form of bracket which I may employ in place of that illustrated in Figs. 1, 2 and 4;

Fig. 6 is a view of the same bracket looking in a direction at right angles to that of Fig. 5; and Fig. 7 is a transverse section on the line 7—7 of Fig. 6, looking in the direction of the arrows.

Figure 1:
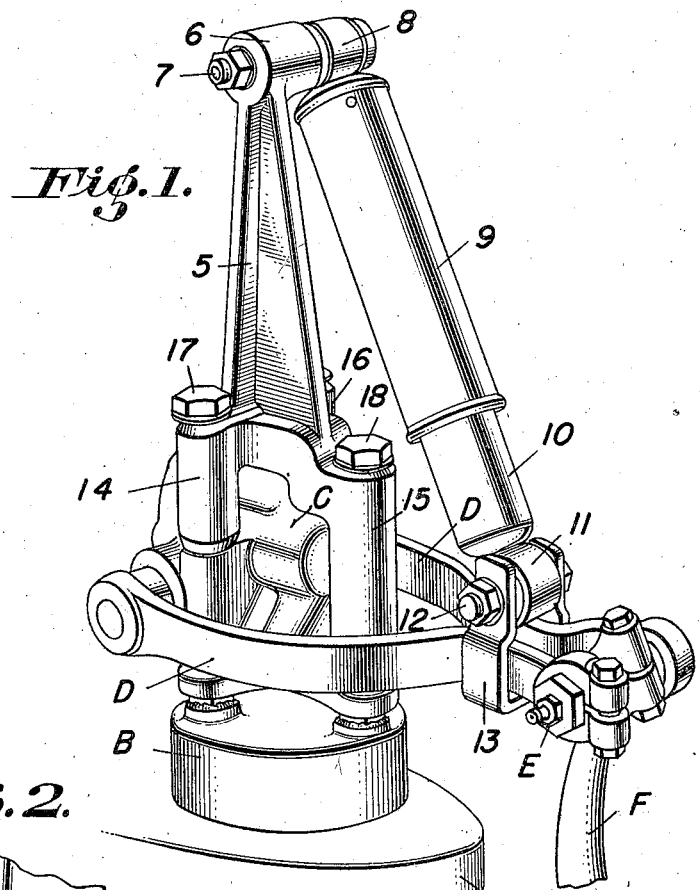
Fig. 1 is a perspective view showing my improved attachment as it appears when applied to one of the standard, hydraulic type shock absorbers now in common use.

Referring to the drawings in detail, A designates a part of the automobile frame to which is secured a socket or housing B adapted to receive the upper end of the usual coil spring B'.

The standard hydraulic type shock absorber is indicated at C and it comprises a hydraulic cylinder and piston, the latter being operated by a pivoted arm comprising the spaced members D, brought together at their free ends and pivotally connected by means of a pin or bolt E with the usual spindle support F.

The standard hydraulic shock absorber C is formed with a base having three perforated ears or lugs C' adapted to fit over threaded studs or bolts 1, 2 and 3, welded as at 4 to suitable bosses on the spring housing B.

My improved attachment comprises a bracket 5, extending vertically, that is to say, at right angles to the axis of the cylinder of the hydraulic shock absorber C.

The upper end of the bracket 5 is formed with a boss 6 through which extends a pin or bolt 7, on which is pivoted the eye 8 of an aero-type auxiliary shock absorber comprising the two telescopic tubular sections 9 and 10. This telescopic or extension type auxiliary shock absorber comprises relatively movable cylinder and piston elements, and may be of any well known and suitable construction, such, for example, as that shown in Patent No. 2,351,662, issued June 20, 1944, to D. L. Christofel.

An eye 11, secured to the section 10 of the auxiliary shock absorber, is attached by means of a bolt 12 to a split clamp 13, which embraces the arm members D adjacent their free ends, at the point where they lie close together. Thus, the auxiliary shock absorber 9, 10 extends diagonally between the upper end of my improved bracket and the free end of the main shock absorber arm.

Figure 2:
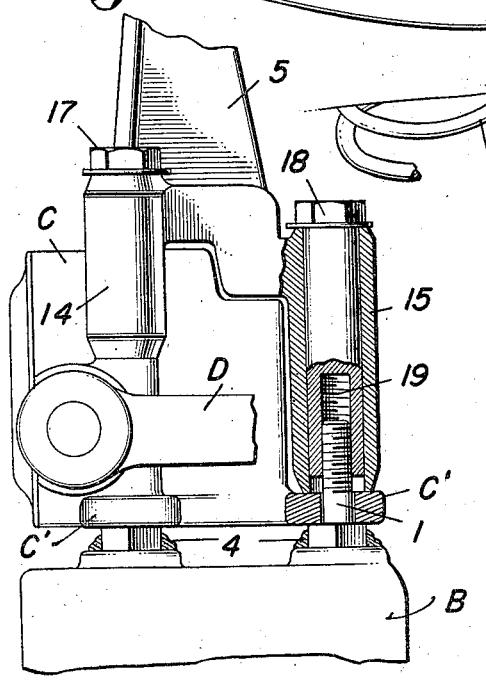
Fig. 2 is a fragmentary side elevation showing a portion of such standard shock absorber with the bracket of my improved attachment secured thereto, parts being broken away, and parts being in section.
Figure 3:
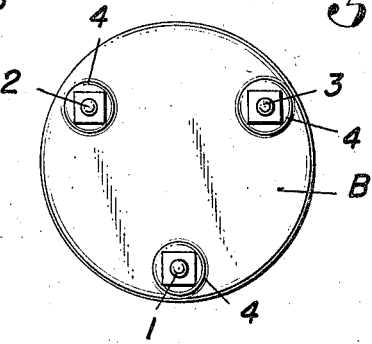
Fig. 3 is a plan view of the part of the frame on which the standard shock absorber is mounted, such view showing the securing bolts or studs.

My method of attaching the improved bracket, constructed as above described, to the standard equipment is as follows. The lower end of the bracket 5 is formed into a relatively broad base of more or less triangular configuration, and this base is provided at its three corners with tubular hollow bosses 14, 15 and 16. These bosses are so positioned that they register with the studs 1, 2 and 3, which project up through the perforated lugs of the main shock absorber C. The internal diameter of the opening or bore in the tubular bosses 14, 15 and 16 is greater than the diameter of the bolts or studs 1, 2 and 3, so that a space is provided within such bore to accommodate barrel nuts such as 17 and 18, as best shown in Fig. 2. The end portions of these barrel nuts are formed with interiorly threaded sockets 19.

In applying my improved attachment to the standard equipment, I first remove the mounting nuts (not shown) which normally engage the studs 1, 2 and 3, to hold the standard shock absorber C in position. I then place the improved bracket in position, with the tubular bosses 14, 15 and 16 fitting over the ends of the studs 1, 2 and 3, from which the standard nuts have been removed. The barrel nuts, such as 17 and 18, are then inserted in the tubular bosses, such as 14 and 15, and the threaded sockets at their lower ends engaged over the upstanding threaded ends of the studs 1, 2 and 3. By tightening these barrel nuts, the bracket 5 is thus mounted upon the standard shock absorber C and is rigidly secured thereto. Having thus secured the bracket in position, the eyes 8 and 11 of the auxiliary shock absorber 9, 10, are attached to the bolts 7 and 12 and the split bracket 13 placed around the arm members D.

From the foregoing, it will be seen that I have provided an attachment for the standard shock absorber equipment now in use, which attachment, when in position, provides a dual shock absorber structure, the auxiliary shock absorber 9, 10 supplementing the action of the main shock absorber C and thus providing the desired additional shock absorbing action or stability.

While, in Figs. 1, 2 and 4, I have shown my improved bracket as formed by casting, I have illustrated in Figs. 5, 6 and 7 a modified construction of bracket which is fabricated from sheet metal.

Referring to these figures, this form of bracket comprises a stamping 5', of channel form, but tapering both ways, as shown in Figs. 5 and 6, and provided at its upper end with an opening 6' for attachment of the auxiliary shock absorber. The lower large end of the stamping 5' is welded as at 5ª to a base member 5ᵇ. This is of substantial inverted U-shape and is provided at its ends with outwardly extending perforated lugs or feet 14' and 16'.

A third piece 19, in the nature of a flat plate, is placed against the back of the channel stamping 5' and secured thereto by welding, as at 19ª. This piece 19 is provided with a downwardly extending leg 19ᵇ, having at its lower end a perforated leg or foot 15'.

Thus the lugs or feet 14', 15' and 16' of this modified construction correspond with the bosses 14, 15 and 16 shown in Figs. 1, 2 and 4.

While in these first figures it was necessary to use barrel nuts to secure the bosses to the studs 1, in the modified construction shown in Figs. 5, 6 and 7 no barrel nuts are necessary, but the perforated lugs or feet, which fit over the studs 1, can be secured thereto by means of the same nuts which originally held the main shock absorber in position. Thus, the modified construction has the advantage of being cheaper to produce and simpler to attach to the existing equipment.

It will be apparent that our improved attachment can be applied to the existing equipment without, in any way, modifying or disturbing the same, the improved bracket, shown in Figs. 1, 2 and 4, being secured by means of barrel nuts to the same mounting studs which normally hold the main shock absorber in position, while the form of bracket shown in Figs. 5, 6 and 7 may be secured to such studs by the same nuts as are used to hold the original equipment. It is therefore thought that the many advantages of the invention will be readily appreciated by those familiar with such matters.

What we claim is:

1. An attachment for shock absorbers having a body including a hydraulic cylinder and a pivoted arm connected therewith, said attachment comprising a bracket constructed to be secured to the body of the shock absorber, and an auxiliary telescopic-type shock absorber connected at one end to said bracket and having means by which the other end may be attached to said pivoted arm.

2. An attachment for shock absorbers having a hydraulic cylinder and pivoted arm connected therewith, said attachment comprising a bracket constructed to be rigidly secured at one end to the shock absorber in a position projecting at right angles to the axis of said cylinder, and an auxiliary extension-type shock absorber connected at one end with the free end of said bracket, said auxiliary shock absorber having means by which its other end may be attached to said pivoted arm adjacent its end, whereby said auxiliary shock absorber extends diagonally between said arm and bracket.

3. An attachment for shock absorbers having a hydraulic cylinder and pivoted arm connected therewith, and formed with openings through which extend threaded studs for securing it in position, said attachment comprising a bracket having a base formed with openings registering with said studs, nuts adapted to engage said studs for mounting said bracket rigidly on said shock absorber, and an auxiliary telescopic-type shock absorber connected at one end to said bracket at a point spaced from said main shock absorber and having means by which the other end may be attached to said pivoted arm.

4. An attachment for shock absorbers having a hydraulic cylinder and pivoted arm connected therewith, and formed with openings through which extend threaded studs for securing it in position, said attachment comprising a bracket having a base formed with openings registering with said studs, said openings being longer and of larger diameter than said studs, barrel nuts extending down through said openings and engaging said studs for securing said bracket in place on said shock absorber, and an auxiliary telescopic-type shock absorber connected at one end to said bracket and having means by which the other end may be attached to said pivoted arm.

5. A dual shock absorber structure comprising a main shock absorber having a hydraulic cylinder and a pivoted arm connected therewith, an elongated bracket rigidly secured to said shock absorber and projecting therefrom in a direction at right angles to the axis of said cylinder, and an extension-type auxiliary shock absorber connected at one end to said bracket at a point spaced from said main shock absorber and at the other end to said arm, whereby both the main and auxiliary shock absorbers co-operate to control the movements of said arm.

6. A dual shock absorber structure comprising a main shock absorber having a hydraulic cylinder and a pivoted arm connected therewith, said shock absorber having openings through which extend fixed studs, a bracket having a base provided with openings registering with the openings in said shock absorber, barrel nuts extending through the openings in said base and engaging said studs to secure said bracket in position on said main shock absorber, and an auxiliary extension-type shock absorber connected at one end to the free end of said bracket and at the other end to said arm, adjacent the end thereof.

ROBERT A. CLAY.